United States Patent [19]

Dransfield

[11] 4,004,651

[45] Jan. 25, 1977

[54] MEANS FOR FLEXIBLY GUIDING THE TRAVEL OF AN UPWARDLY PROPELLED WEIGHT

[75] Inventor: Clifford D. Dransfield, Dallas, Tex.

[73] Assignee: Atlantic Richfield Company, Los Angeles, Calif.

[22] Filed: Sept. 8, 1975

[21] Appl. No.: 611,351

[52] U.S. Cl. .............................. 181/117; 181/114; 181/401

[51] Int. Cl.² .......................................... G01V 1/04

[58] Field of Search ............ 181/114, 116, 117, 401

[56] References Cited

UNITED STATES PATENTS

| | | | |
|---|---|---|---|
| 3,205,971 | 9/1965 | Clynch | 181/114 |
| 3,810,524 | 5/1974 | Dransfield | 181/117 |
| 3,884,324 | 5/1975 | Hamilton et al. | 181/114 |
| 3,901,351 | 8/1975 | Johnson | 181/401 X |

Primary Examiner—Leland A. Sebastian
Attorney, Agent, or Firm—Robert M. Betz

[57] ABSTRACT

Arms extending laterally from an upwardly moving weight, such as a rebounding seismic gas exploder, terminate in guide assemblies adapted to engage a plurality of parallel semi-rigid, resilient ropes connected between the top and the bottom of a supporting frame so that the weight must follow their path. Each guide assembly contacts its respective rope at several vertically spaced positions so as to distribute side loads along the rope resulting from eccentric exploder movement. The construction prevents the exploder from tilting sufficiently to catch or lock on the one or more ropes, thus avoiding pendulum movement of the exploder and abrasion of the ropes.

16 Claims, 7 Drawing Figures

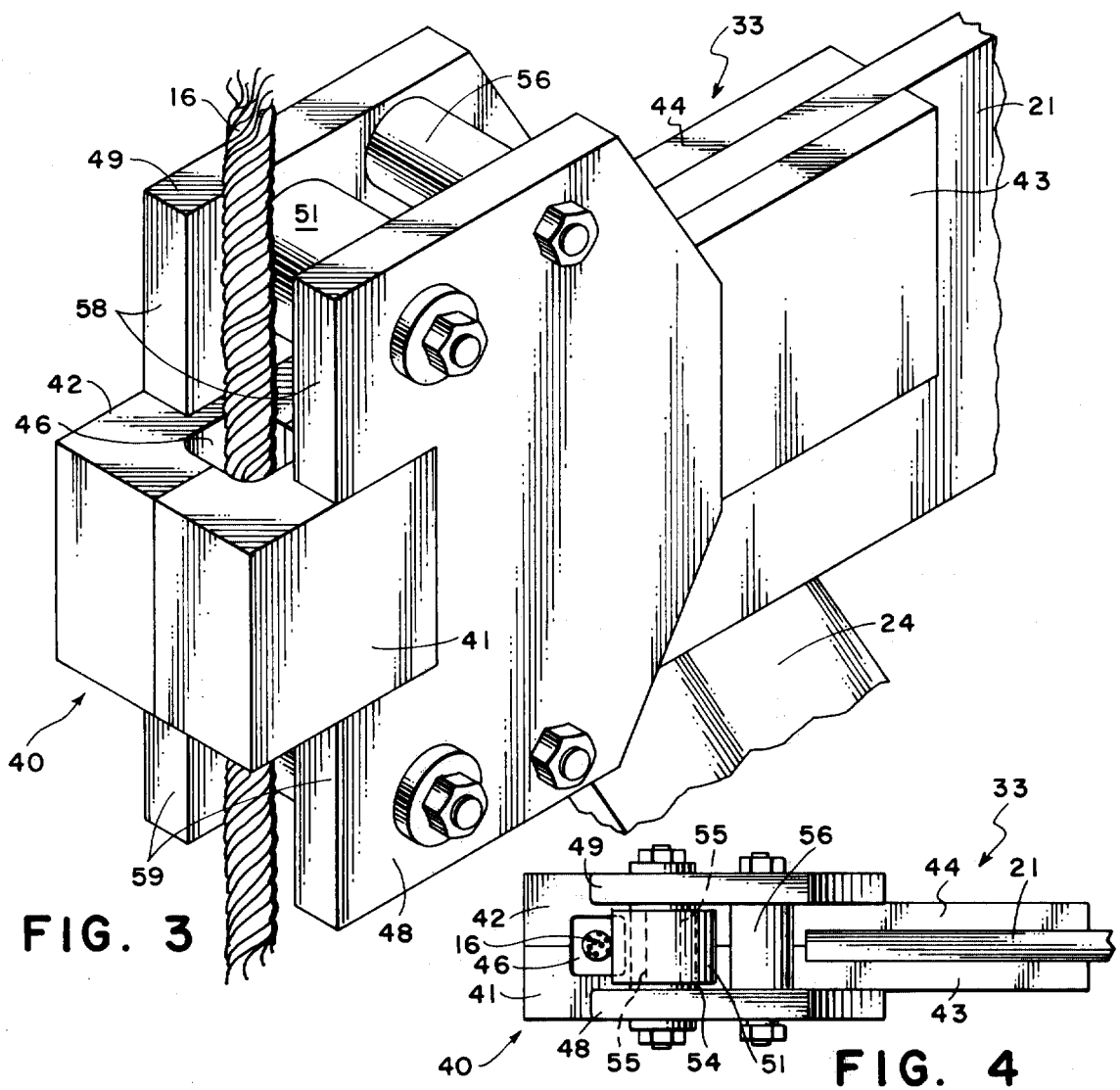
FIG. 3
FIG. 4
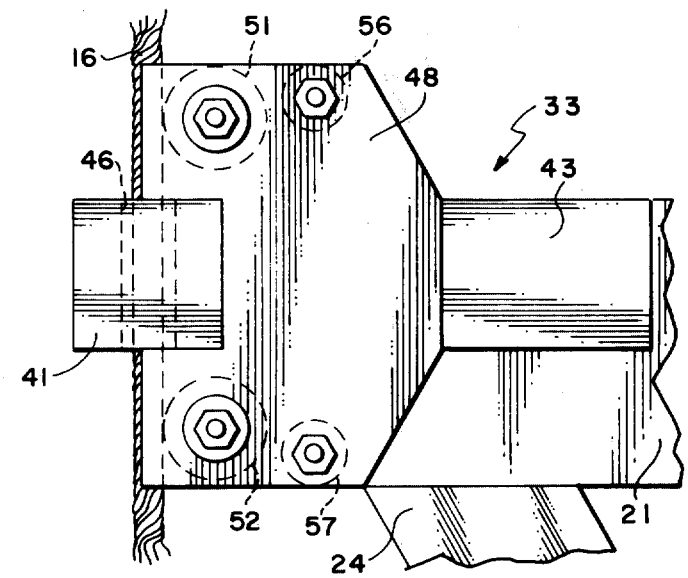
FIG. 5

MEANS FOR FLEXIBLY GUIDING THE TRAVEL OF AN UPWARDLY PROPELLED WEIGHT

BACKGROUND OF THE INVENTION

1. Field of the Invention.

This invention relates generally to mechanisms for guiding the travel of vertically propelled weights, such as a seismic gas exploder of the type which applies a downwardly directed impulse to the earth and which thereafter rebounds upwardly. The invention is especially concerned with mechanisms of this type designed to guide the travel of a seismic gas exploder along resilient ropes wherein the effect of eccentric or non-vertical motion of the exploder is minimized.

2. Description of the Prior Art.

As described in Applicant's co-pending application, Ser. No. 427,929, filed Dec. 26, 1973, now U.S. Pat. No. 3,951,229, a seismic gas exploder may be positioned within a platform-mounted upstanding frame having supported therein from top to bottom a plurality of parallel tensioned ropes spaced in symmetrical array outwardly of the periphery of the gas exploder. The ropes are slidably engaged by bushings fixed to the extremities of a plurality of radially extending arms carried by the gas exploder so as to permit travel along the ropes in a vertical direction with elastic lateral support subsequent to an explosion.

An exploder guided as described above may be tilted and thrust upward at an angle to the vertical for several reasons, such as being positioned on uneven terrain or because the force of the initial explosion therein is not centered in a downward direction. In such case, if the encircling bushings are longitudinally short in relation to their bore diameters, the exploder can tilt considerably without forcing the ropes out of line. This increases the likelihood that one or more bushings will momentarily catch on their respective ropes, with the result that the exploder may pivot or swing about these points of contact with pendulum movement. This also increases the likelihood that the rope will kink or abrade.

Further, a single bushing or other interconnecting means with a short axis concentrates side loads against a rope or ropes over a short distance so as to increase the chance of rope failure under repeated use.

In order to improve the operation of this apparatus, the Applicant first considered lengthening the rope encircling bushings into long continuous sleeves so as to prevent the exploder from tilting against the ropes and to distribute the load more widely. This construction has the disadvantage, however, that a greater surface becomes available to create friction resistance to exploder movement. A solution was arrived at which has the advantages of a long sleeve and yet minimizes frictional resistance to such movement.

It is therefore a general object of this invention to provide an apparatus for guiding the travel of a seismic gas exploder of the type described wherein eccentric reactive forces transmitted by the exploder to the members defining its desired path are distributed so as to avoid high load concentration on such members.

It is another object of this invention to provide apparatus of the type described wherein the exploder is prevented from tilting substantially in relation to the path-defining members. It is a further object of this invention to provide an apparatus of the character described wherein the exploder is guided upwardly with a minimum of friction. These and other objects of this invention will become apparent from the following detailed description of the preferred embodiments of this invention and as illustrated in the drawings appended hereto.

SUMMARY OF THE INVENTION

In accordance with the preferred aspect of this invention, an improved guidance apparatus is provided for use with a seismic gas exploder which is to be propelled upwardly within a supporting frame. Arms mounted on the gas exploder extend radially from its vertical axis into cooperative engagement with each of a plurality of parallel resilient ropes stretched between the top and the bottom of the frame so that the exploder may ride easily therealong in a vertical direction as it rebounds from the earth. Each arm terminates in a guide assembly which comprises a plurality of vertically spaced apart contact elements which in combination distribute side loads from the exploder to the rope over a predetermined length thereof and which are designed to enable the exploder to follow the rope without complete encirclement thereof. These contact elements preferably include an intermediate sleeve to slidably receive the rope and a pair of flanged rollers adapted to bear radially outward against the rope above and below the sleeve respectively. When the two rollers simultaneously engage the rope, it centralizes within the sleeve with the consequence that the exploder moves upwardly with rolling instead of sliding friction. If eccentric exploder movement causes any rope to leave the rollers, a restoring force will be transmitted through the arms.

BRIEF DESCRIPTION OF THE DRAWINGS

FIG. 3 is an isometric view of one of the guide assemblies of this invention.

FIG. 4 is a plan view of the guide assembly of FIG. 3.

FIG. 5 is an elevational view of the guide assembly of FIG. 3.

DESCRIPTION OF THE PREFERRED EMBODIMENTS

Figure 1:
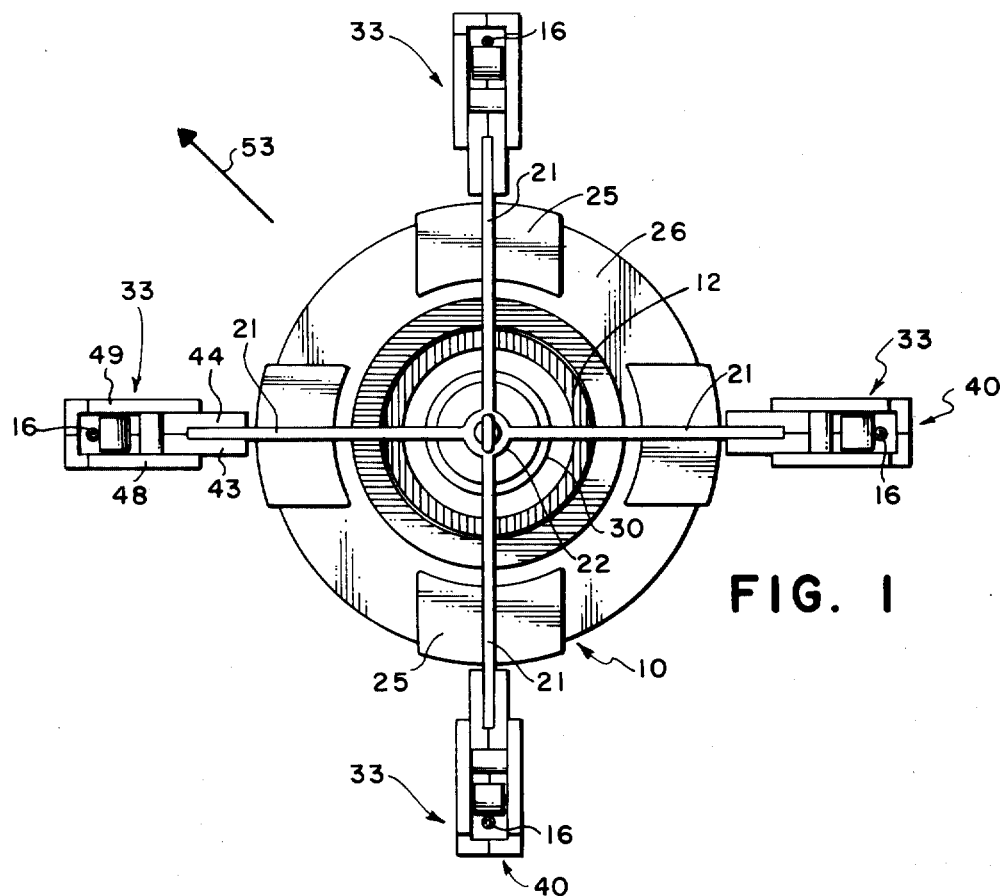
FIG. 1 is a plan view of the apparatus of this invention assembled with a seismic gas exploder.
Figure 2:
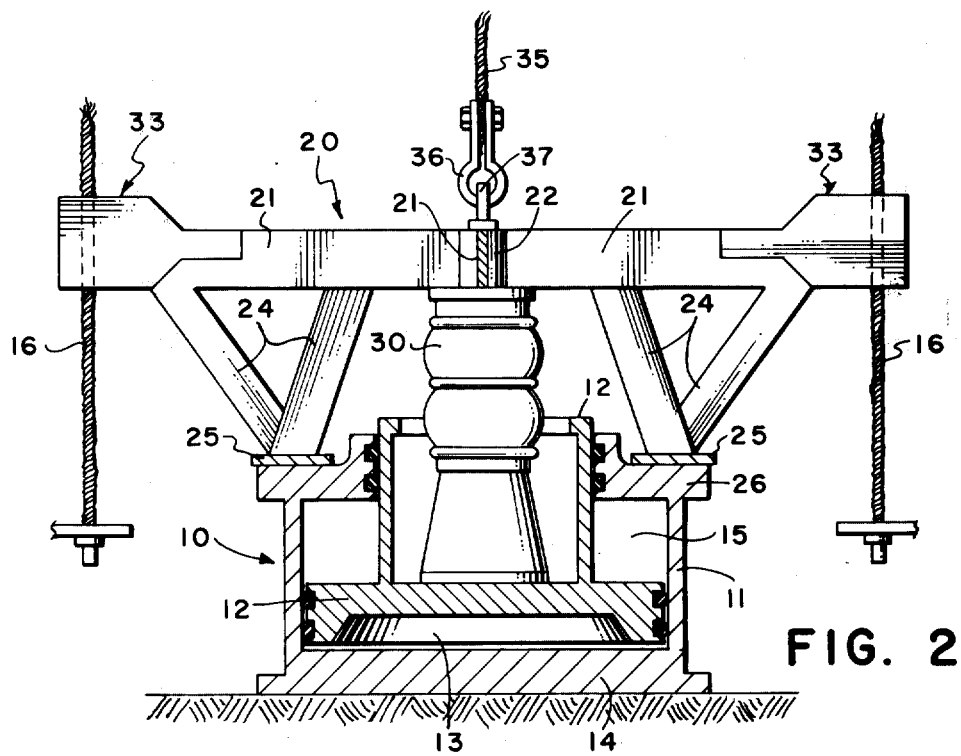
FIG. 2 is an elevational view of the apparatus of this invention also shown assembled with a seismic gas exploder.

With reference now to the preferred embodiment of FIGS. 1 and 2, there is illustrated a known form of seismic gas exploder 10 resting on the earth, consisting generally of an outer cylinder 11 and an inner piston 12 which forms therewith an expansible combustion chamber 13. Ignition of an explosive gas mixture within the chamber 13 drives a solid pan 14 downwardly so as to deliver a seismic pulse to the earth while the piston 12 is driven upwardly against the counterpressure of an air box 15. The reaction force from the earth also propels the entire exploder 10 in an upward direction.

A plurality of parallel vertically extending ropes 16 are positioned within any suitable upstanding fixed or vehicle-mounted frame (not shown) and are understood to be connected between the top and bottom of such frame in spaced peripheral relation to the exploder 10. The manner of this connection is more particularly described in Applicant's co-pending application Ser. No. 427,929 now U.S. Pat. No. 3,951,229. The ropes 16, which define a desired path of travel for the exploder 10, may be any elongate members, preferably of generally circular cross section and of laterally resilient construction such as semi-rigid bright wire ropes. If desired, flexible fiberglass or steel rods or tubes may be used in place of the ropes 16.

On the top of the exploder 10 there is positioned a spider assembly 20 whose purpose will be shown to facilitate suitable interconnection between the exploder 10 and the ropes 16. The spider assembly 20 consists generally of a plurality of laterally extending arms 21 fastened, as by welding, to a center post 22 axially aligned with the exploder 10. The arms 21 extend radially outward from this center post 22. Each such arm 21 is supported by means of a like pair of diagonal upstanding braces 24 which rest upon a respective one of a plurality of mounting pads 25 situated in appropriate peripheral positions on a horizontal upper flange 26 of cylinder 11.

A segmented bellows 30 constructed, for example, of fabric reinforced rubber is inserted between the undersurface of the spider assembly 20 and the piston 12. This bellows 30 compresses with upward travel of the piston 12 and is highly resistant to torque so as to inhibit relative rotational movement between the piston 12 and the cylinder 11.

As shown, the arms 21 are four in number and are directed at right angles to each other, although the number of the arms 21 will in each instance correspond to the number of guide ropes 16.

Each arm 21 terminates adjacent one of the ropes 16 at which point it supports one of a like plurality of similar guide assemblies 33. Each such guide assembly 33 is adapted to engage a respective one of guide ropes 16 at spaced intervals by means of which either partially or completely surround or encircle and confine such guide ropes 16. It is the construction, operation and function of the guide assemblies 33 in their various alternate embodiments with which this invention is most particularly concerned. In the illustration of FIGS. 1 and 2, the exploder 10 is coupled to any convenient lift means (not shown) by means of a flexible lift rope 35 secured by means of a clevis 36 to an eyebolt 37 attached to the upper surface of the spider assembly 20. As discussed in copending application Ser. No. 427,929, such lift means are useful in catching the exploder 10 at the top of its upward travel and in controlling its subsequent descent. However, the invention to be described is not limited to use in conjunction with any such lift means.

Attention is now directed to the illustrations of FIGS. 3, 4 and 5 showing in greater detail one of guide assemblies 33 contacting any of guide ropes 16. As is best understood from the isometric view of FIG. 3, a split sleeve 40, consisting of mating members 41 and 42, is fastened to the extremity of the arm 21 by means of horizontal projections 43 and 44. The members 41 and 42 are positioned beyond the end of the arm 21 so that a smooth surfaced vertical bore 46 formed therebetween slidably accommodates the guide rope 16 with any desired clearance. A pair of parallel vertically extending side plates 48 and 49 are fastened against the projections 43 and 44 and are notched so that they fit snugly over and under the mating sleeve members 41 and 42.

Additional contact is made with the rope 16 at points vertically spaced at desired intervals above and below the sleeve 40 by means of a pair of upper and lower rollers 51 and 52. These rollers are mounted on horizontal axes transverse to the radial direction of the leg 21. As best seen in FIG. 5, the rollers 51 and 52 are adapted to make rolling contact with the guide rope 16 and in such position of engagement the guide rope 16 is substantially centralized within the bore 46. Thus, the possibility of sliding friction between the guide rope 16 and the bore 46 is eliminated as long as such condition of engagement is maintained. The rollers 51 and 52 are preferably pressfitted integrally with sleeve bearings such as bearing 54, for example, of bronze which rotates on a central shaft 55 (seen in dotted outline, FIG. 4) which is suitably bolted in place between the side plates 48 and 49. Additional rigidity may be provided for the side plates 48 and 49 by means of upper and lower horizontal spacers 56 and 57 positioned adjacent the rollers 51 and 52 respectively.

It will be observed that side plates 48 and 49 project radially outward beyond the transverse center line of the aperture 46 as far as desired so as to create the effective upper and lower flanges 58 and 59. These flanges 58 and 59 prevent the ropes 16 from sliding off either end of rollers 51 or 52 while in engagement therewith and otherwise keep the guide assembly 33 aligned with the rope 16. It should now be apparent that the guide assembly 33 can track with or follow the rope 16 without the aid of the sleeve 40 except in the event of substantial eccentric motion of exploder 10. The main purpose of the sleeve 40 is to ensure that the rope 16 does not completely leave or become disengaged from the guide assembly 33 as a result of such eccentric movement.

In operation, when the exploder 10 is propelled upwardly, as long as it follows a substantially steady upward path, its major contact with the ropes 16 will be through respective pairs of rollers 51 and 52 rather than against the vertical bores 46 of the sleeves 40. At such times as the ropes 16 contact one or more bores 46 momentarily, the available friction surface is limited in extent by the height of the sleeve 40 rather than the entire height of the assembly 33. If the exploder 10 attempts to tilt with respect to one of the ropes 16, either the upper or the lower roller 51 or 52 in conjunction with the sleeve 40 provides counter leverage to restore the desired alignment. Since the guide assembly 33 connot substantially misalign with rope 16, the possibility of pendulum motion of the exploder 10 is virtually eliminated.

However, as is most likely, the exploder 10 may experience a net vector force of greater or lesser degree in some indeterminate lateral direction differing from the desired path path established by the ropes 16. If, for example, a net lateral force exists in the direction of arrow 53, midway between two of the ropes 16 as shown in FIG. 1, each of these ropes 16 will be engaged by its respective pair of rollers 51 and 52 and partially restrained by its respective pair of side plates 48 and 49. The two opposite ropes 16 will be momentarily in sliding contact with their respective sleeves 40. The interconnection of the four arms 21 through the spider assembly 20 together with the elasticity of the ropes 16 will exert appropriate restoring forces to return the ropes 16 to a centralized position within their respective sleeves 40 so that rolling friction again predominates.

The side loads on ropes 16 adjacent the direction arrow 53 will be distributed over a length of these ropes measured by the vertical distance between the generally horizontal contact lines of the surfaces of the rollers 51 and 52. This length is a matter of choice and does not affect the total frictional contact surface available between the assembly 33 and the rope 16. The side load concentration on ropes 16 opposite the position of the direction arrow 53 will momentarily be greater because friction contact therewith is substantially limited to the walls of the bores 46 of sleeves 40 of the associated assemblies 33. These load concentrations will however be lessened because of the reduced tilt which the exploder 10 can experience.

Figure 6:
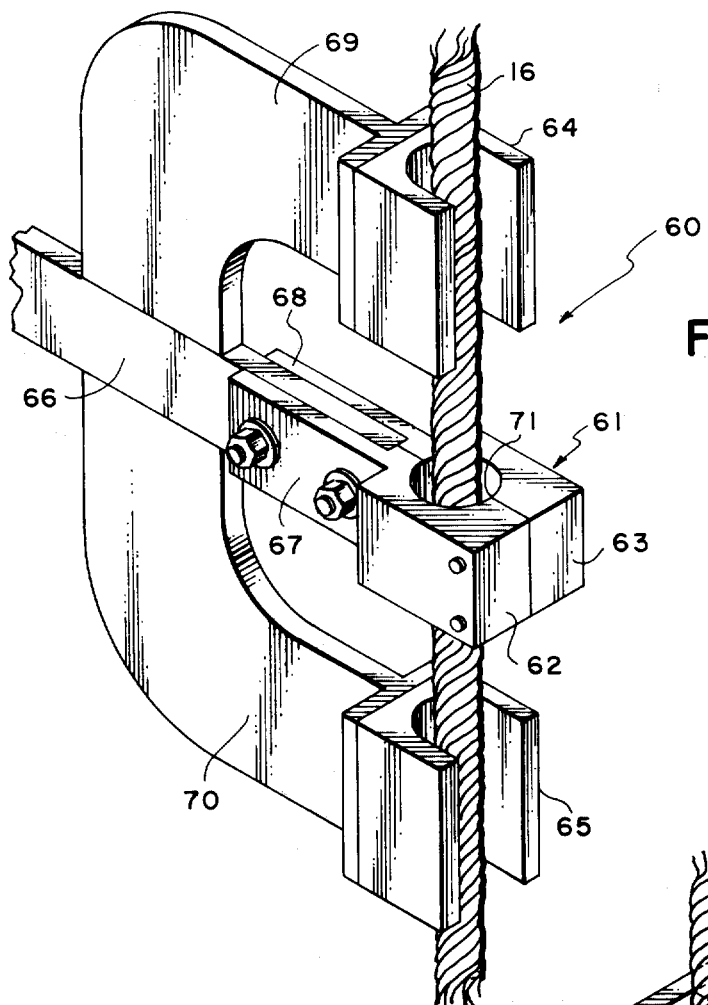
FIG. 6 is an isometric view of an alternate embodiment of the apparatus of this invention.

In the alternate embodiment of this invention shown in FIG. 6, a guide assembly 60 consists generally of an intermediate sleeve 61, composed of mating halves 62 and 63, positioned in spaced vertical relation between an upper shoe 64 and a lower shoe 65 each of which partially encircles any of guide ropes 16. Mating portions 62 and 63 may be affixed to opposite sides of a spider arm 66 by means of integral arm portions 67 and 68. The shoes 64 and 65 are conveniently positioned by means of upper and lower curved supports 69 and 70 so that the apertures thereof are in general axial alignment with the bore 71 of the split sleeve 61. The operation of a plurality of guide assemblies 60 in interconnecting devices such as exploder 10 with ropes 16 is similar to that of the guide assembly 33. That is, side loads are normally distributed over a length of each of ropes 16 determined by the maximum distance between the shoes 64 and 65. Also, the shoes 64 and 65 will preferably engage the rope 16 so as to maintain clearance between the rope 16 and the bore 71. All frictional forces in this embodiment will however be of a sliding nature.

Figure 7:
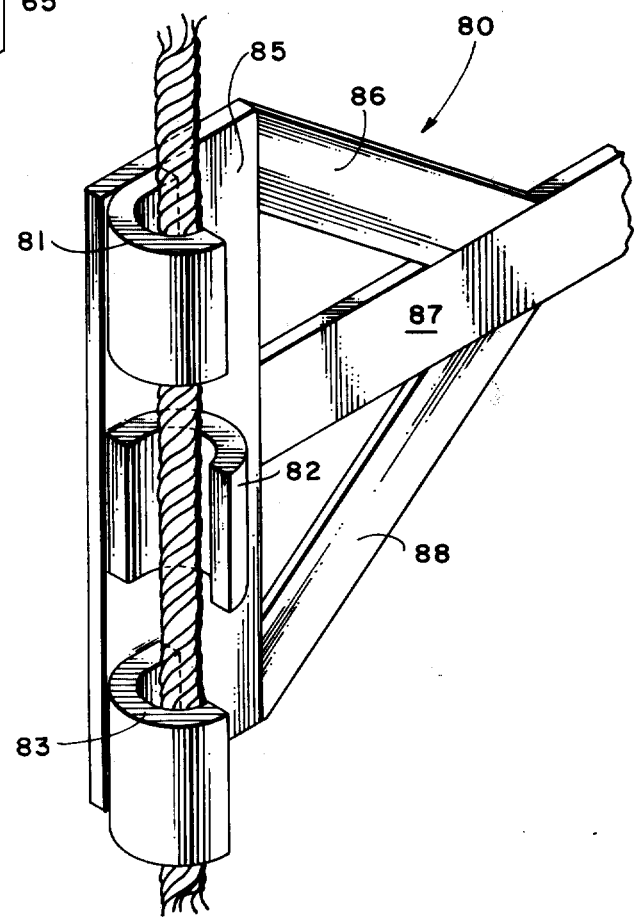
FIG. 7 is an isometric view of another alternate embodiment of this invention.

A further alternate of this invention is set out in the illustration of FIG. 7. A guide assembly 80 includes upper, intermediate and lower half-round contact shoes 81, 82 and 83 respectively. These shoes can be conveniently welded in place against one vertical surface of an upstanding support member 85 provided with braces 86, 87 and 88 for interconnection with a spider arm (not shown) similar in character to those previously described. It will be observed that the apertures of upper and lower shoes 81 and 83 face oppositely to that of intermediate shoe 82. This makes it a simple matter to threadably engage the one-piece assembly 80 with a guide rope 16 without disengagement thereof from its upper and lower supports. The load distribution, alignment and friction limitation advantages of the previous embodiments described are again present. Engagement of the rope 16 by the shoes 81 and 83 is designed to prevent contact between the rope 16 and intermediate shoe 82. All friction is of a sliding nature.

The embodiments of the invention in which an exclusive property or privilege is claimed are defined as follows.

1. In an apparatus for flexibly guiding the path of a moving weight above the earth including an upstanding frame within which the weight is upwardly propelled, a plurality of parallel elongate members connected between the top and the bottom of the frame and spaced laterally adjacent the weight, and a like plurality of means rigidly interconnected with the weight for guiding the weight along the respective elongate members, the improvement wherein each of said guide means comprises a plurality of vertically spaced apart contact elements adapted to at least partially surround a respective one of said elongate members at correspondingly spaced vertical intervals, so that when the upper and lower most of said contact elements engage said respective elongate member simultaneously, frictional contact between said elongate member and the intermediate contact elements is substantially eliminated.

2. The improvement claimed in claim 1 wherein said contact elements are three in number, the intermediate one of said contact elements being adapted to completely encircle and receive said elongate members slidably therethrough.

3. The improvement claimed in claim 2 wherein said upper and lower contact elements are each adapted to engage said elongate member slidably.

4. The improvement claimed in claim 2 wherein said upper and lower contact elements are each adapted to engage said elongate member rollably.

5. The improvement claimed in claim 4 wherein said intermediate slidably engaging contact element is a cylindrical sleeve and wherein said upper and lower rollably engaging contact elements comprise a pair of roller mounted on horizontal axes respectively above and below said sleeve, said rollers being oriented so that when both are engaged said elongate member is substantially centralized within the bore of said sleeve.

6. The improvement claimed in claim 1 wherein none of said contact elements is adapted to completely surround said elongate member, thereby permitting threadable engagement and disengagement of said elongate member with said guide means without disassembly of said elongate member from said frame.

7. The improvement of claim 6 wherein at least one of said contact elements is adapted to permit free lateral movement of said elongate member with respect thereto in one direction, the remainder of said contact elements being adapted to permit free lateral movement of said elongate member with respect thereto in a substantially opposite lateral direction.

8. The improvement claimed in claim 1 wherein said contact elements are two in number and are both adapted to completely encircle said elongate member.

9. An apparatus for controlling the rebound path of a seismic gas exploder above the earth comprising:
  a. an upstanding frame within which the exploder is adapted to move,
  b. a plurality of resilient elongate members connected between the top and the bottom of the frame and spaced laterally adjacent the exploder,
  c. a spider mounted on the exploder having arms projecting radially from a common center toward said respective elongate members,
  d. a sleeve secured to the extremity of each of said arms adapted to slidably receive therethrough a respective one of said elongate members, and
  e. a pair of rollers mounted on horizontal axes above and below each said sleeve in fixed relation thereto and at right angles to said arm, said rollers being enabled to rollably engage said elongate members simultaneously responsive to the movement of said exploder so that in such condition of engagement frictional contact between said elongate member and said intermediate sleeve is eliminated.

10. Apparatus as in claim 9 wherein means are fixed at opposite ends of each roller to prevent sliding disengagement between said elongate member and each said roller.

11. Apparatus as in claim 10 wherein means for preventing sliding disengagement comprise a pair of parallel vertically extending plates extending above and below said sleeve and adapted to support said pair of rollers therebetween.

12. The apparatus for guiding the free upward travel of a weight responsive to a force thereon and the subsequent downward travel of said weight under the influence of gravity comprising:
   a. an upstanding frame within which the weight is adapted to move,
   b. a plurality of elongate members connected between the top and the bottom of the frame and spaced laterally adjacent the weight,
   c. a support bracket secured with the weight having arms projecting radially from a common center to said elongate members respectively,
   d. first vertical guide means secured to the extremity of each of said arms adapted to surround and slidably receive therethrough a respective one of said elongate members, and
   e. plural second vertical guide means secured to the extremity of each of said arms and positioned to enable simultaneous movable contact with a respective one of said elongate members above and below said first guide means respectively so that the load on said elongate member resulting from the motion of said weight is distributed over a length thereof measured by the contact distance between said second guide means.

13. Apparatus as in claim 12 wherein said second guide means is a pair of upstanding shoes.

14. Apparatus as in claim 13 wherein each said pair of shoes are adapted to partially encircle a respective one of said elongate members thereby substantially restricting lateral movement of said elongate member relative thereto.

15. Apparatus as in claim 12 wherein said second guide means is a pair of rollers adapted to bear rollably against a respective one of said elongate members.

16. Apparatus as in claim 12 wherein said elongate members consist of resilient ropes under axial tension so that they are adapted to yield elastically in a lateral direction responsive to laterally directed load components induced thereon by said weight.

* * * * *